Figure 1:
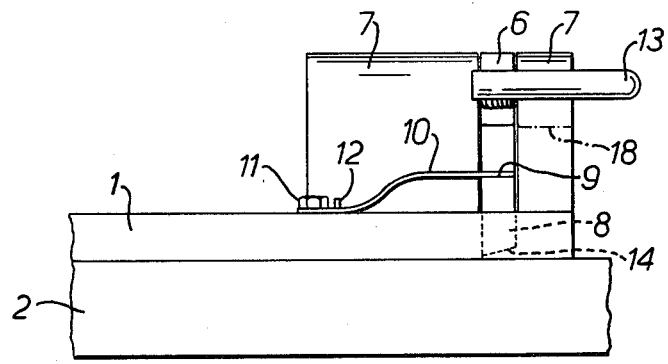

United States Patent [19]

Ottewell

[11] 4,371,061
[45] Feb. 1, 1983

[54] BRAKE SHOES FOR RAILWAY DISC BRAKES

[75] Inventor: Gerald A. Ottewell, Solihull, England

[73] Assignee: Lucas Industries Limited, Birmingham, England

[21] Appl. No.: 212,369

[22] Filed: Dec. 3, 1980

[30] Foreign Application Priority Data

Jan. 30, 1980 [GB] United Kingdom ............... 8003102

[51] Int. Cl.³ .............................................. F16D 65/04
[52] U.S. Cl. ................................ 188/244; 188/73.32; 188/250 G; 403/328
[58] Field of Search .............. 188/234, 243, 244, 242, 188/246, 236, 247–248, 250 G, 73.1, 73.2, 73.32–73.34, 238–241; 403/328, 329, 324

[56] References Cited

U.S. PATENT DOCUMENTS

| 799,296 | 9/1905 | Bennett | 403/329 X |
| 1,220,792 | 3/1917 | Smith, Jr. | 403/329 X |
| 1,586,369 | 5/1926 | Koplow | 403/329 X |
| 3,432,194 | 3/1969 | Garnier | 403/329 X |
| 3,851,738 | 12/1975 | Gebhardt et al. | 188/250 G X |
| 4,004,659 | 1/1977 | Rochall et al. | 188/244 |
| 4,271,936 | 6/1981 | Xaver et al. | 188/244 |

FOREIGN PATENT DOCUMENTS 2016674 11/1971 Fed. Rep. of Germany ...... 188/235

Primary Examiner—Douglas C. Butler
Attorney, Agent, or Firm—Scrivener, Clarke, Scrivener and Johnson

[57] ABSTRACT

A brake shoe (1) for a railway brake has a dovetail slot (4) in its front face for receiving a projection (3) of complementary shape on a brake pad (2) for mounting the pad on the shoe, and a retainer (6) slidably mounted in an aperture in the shoe and having a tongue (8) which projects into the slot for retaining the pad on the shoe, the retainer being biased by leaf-springs (10) fixed to the rear face of the shoe into an operative position so that danger of the retainer being left in a retracted position after a pad replacement operation is eliminated.

7 Claims, 4 Drawing Figures

U.S. Patent  Feb. 1, 1983  4,371,061

BRAKE SHOES FOR RAILWAY DISC BRAKES

This invention relates to railway disc brakes and more particularly to a brake lining carrier or shoe adapted for easy replacement of a brake pad mounted on the shoe.

In U.S. Pat. No. 4,004,659 there is disclosed a brake lining carrier having a slot of dovetail section in its front face, the slot being open at one end of the carrier to allow a brake lining to be mounted on the carrier by sliding a projection on the rear face of the lining into the dovetail slot. To maintain the lining on the carrier a retainer is mounted on the rear of the carrier and projects through an opening in the carrier to extend across the dovetail slot adjacent its open end so that the end of the lining projection abuts against the retainer to prevent the projection sliding out of the dovetail slot and hence the lining becoming detached from the carrier. The retainer can be retracted to a position in which it is clear of the dovetail slot to allow removal and replacement of the lining and for this purpose the retainer is attached to the carrier by pin and slot arrangements which permit limited movement of the retainer between its operative and retracted positions. The pin and slot connections include spring elements adapted to cooperate with the pins to lock the retainer in its adjusted, i.e. retracted or operative position.

In the known construction the retainer always remains attached to the carrier and risk of it becoming lost, such as during lining replacement, is eliminated. However, because the retainer is locked in the retracted position there is a danger that a person replacing the brake lining may fail to return the retainer to its operative position at the end of the replacement operation, for example due to his attention being distracted at a critical moment.

This drawback is avoided in a disc brake shoe according to the present invention, which comprises a slot in its front face for receiving a brake pad slidingly engaged therewith, the slot being open at one end of the shoe, an aperture in the shoe adjacent said one end, the aperture opening into the slot from the rear of the shoe, a retainer slidably received in the aperture for movement between an operative position in which it protrudes into the slot and a retracted position in which it is clear of the slot, and spring means acting on the retainer element to bias the element into its operative position.

With this construction the retainer element can be withdrawn to its retracted position, for example by pulling on a handle which may be fixed to the retainer element, to enable removal and replacement of the pad, but as soon as the retainer element is released it will move back to its operative position under the bias of the spring means.

Figures 2, 4:
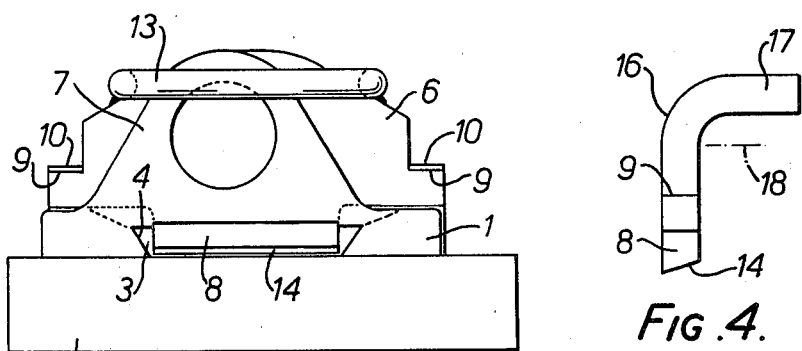
Figure 3:
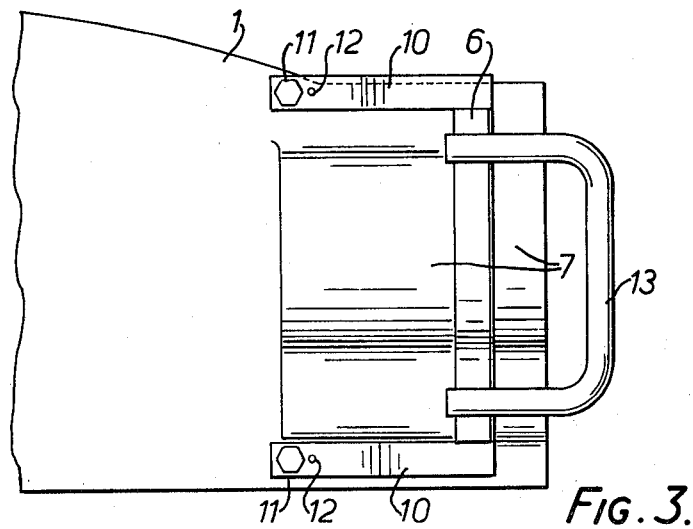

A more complete understanding of the invention will be had from the following description which is given by way of example with reference to the accompanying drawings in which:

FIG. 1 is a side view showing an end part of a brake shoe and pad assembly;
FIG. 2 is an end view of the assembly;
FIG. 3 is a top plan view of the shoe; and
FIG. 4 illustrates a modified form of retainer.

In the drawings a railway disc brake shoe is designated by the number 1 and a brake lining pad is designated by the number 2. The pad includes an elongate projection 3 of dovetail section on its rear face, the projection 3 being slidingly received in a slot 4 of complementary shape provided in the front face of the shoe 1. The slot 4 is open at the end of the shoe 1 shown in the drawings to allow the pad to be mounted on and detached from the shoe. To maintain the pad on the shoe during normal use of the brake a retainer plate 6 is provided. The retainer plate is mounted between a pair of lugs 7 on the rear of the shoe 1 and includes a tongue 8 which passes through an aperture formed in the shoe and protrudes into the slot 4. As may be seen in FIG. 2, the aperture and tongue 8 extend transversely of and substantially the full width of the slot 4.

At its lateral edges the retainer plate 6 is formed with upwardly directed shoulders 9 against which the free ends of a pair of leaf springs 10 bear pressing the retainer plate downwardly against the shoe. The opposite ends of the leaf springs 10 are fastened to the shoe by bolts 11. Rotation of the springs about the bolt axes, which could cause them to disengage the shoulders 9, is prevented by location pins 12 fixed to the shoe and passing through holes in the respective springs 10.

A U-shaped handle 13 is welded to the retainer plate 6 and extends at right angles to it. The handle enables the retainer plate to be pulled up against the force of the springs 10 to a retracted position in which the tongue 8 is withdrawn into the shoe aperture and no longer protrudes into the slot 4 so that the pad 1 can be detached by sliding its projection 3 out of the slot 4. When the handle 13 is released the retainer plate 6 is returned automatically to the operative position, in which it is shown in the drawings, by the springs 10.

From the foregoing description it will be appreciated that with a shoe having a pad retainer according to the invention, the operation of replacing a worn brake pad is a very simple one. The retainer plate remains attached to the shoe so there is no danger of it being lost, and it is returned automatically to the operative position when released so there is no risk of it being inadvertently left in the retracted position.

The forward end 14 of the retainer plate tongue 8 is chamfered to assist in mounting a new pad on the shoe. Once the leading edge of the projection 3 has been inserted into the slot far enough to have engaged the chamfer surface of the tongue 8, the retainer plate can be released. The projection 3 will slide past the tongue 8 until the tongue snaps down behind the trailing end of the projection 3, providing an indication that the pad 2 is correctly mounted. It may be possible to arrange the chamfer surface 14 so that the retainer plate is lifted automatically on sliding the pad projection 3 into the slot 4, in which case it becomes unnecessary to retract the retainer plate by pulling on its handle during pad mounting.

The modified form of retainer plate 16 shown in FIG. 4 differs from that of the previous Figures in that it has an integral handle formed by bending an upper end portion 17 over at right angles. With this embodiment it may be expedient to reduce the height of the outer end lug 7 of the shoe to the height indicated in chain line 18 in FIGS. 1 and 4. In all other respects the retainer plate 16 and its mounting are the same as in FIGS. 1 to 3.

What is claimed is:

1. A brake shoe for a railway brake, the shoe comprising opposed front and rear faces, an elongate slot in said front face for mounting a brake pad on said shoe, the slot being open at one end and being slidably engagable through said open end thereof by a projection on said pad, an aperture in the shoe adjacent said open end of the slot, the aperture opening into said slot at the front face of the shoe, a retainer mounted slidingly in the aperture for engaging said brake pad to retain said pad on the shoe, the retainer being mounted on the shoe for movement between operative and retracted positions, and the retainer including a part which protrudes into said slot through the aperture in the said operative position of the retainer and which part is withdrawn through the aperture to be clear of the slot in the said retracted position of the retainer, and spring means acting at all times on said retainer in all positions thereof to bias the retainer in the direction from said retracted position towards said operative position, said spring means having one end fixed to the rear face of the shoe and an opposite end which is free and separate from said retainer and bears against a rearwardly facing surface on the retainer.

2. A brake shoe as claimed in claim 1, wherein the spring means comprises a pair of springs acting on the retainer at respective positions spaced apart from each other laterally of the shoe.

3. A brake shoe according to claim 2, wherein the springs are leaf springs.

4. A brake shoe according to claim 2, wherein the retainer is a plate and said retainer part is a tongue integral with said plate.

5. A brake shoe according to claim 4, wherein said tongue has a chamfer surface to facilitate engagement of the pad in the slot.

6. A brake shoe according to claim 5, wherein said chamfer surface is adapted to cam the retainer to said retracted position on engagement by the pad pushed through the open end of the slot.

7. A brake shoe according to claim 2, wherein the retainer is provided with a handle for pulling the retainer into the retracted position against the bias of said springs.

* * * * *